United States Patent
Wright

(10) Patent No.: US 11,453,827 B1
(45) Date of Patent: Sep. 27, 2022

(54) SYNGAS GENERATION FOR GAS-TO-LIQUID FUEL CONVERSION

(71) Applicant: Greenway Innovative Energy, Inc., Fort Worth, TX (US)

(72) Inventor: Raymond Wright, Arlington, TX (US)

(73) Assignee: Greenway Innovative Energy, Inc., Fort Worth, TX (US)

( * ) Notice: Subject to any disclaimer, the term of this patent is extended or adjusted under 35 U.S.C. 154(b) by 0 days.

(21) Appl. No.: 17/135,245

(22) Filed: Dec. 28, 2020

Related U.S. Application Data

(63) Continuation of application No. 16/813,582, filed on Mar. 9, 2020, now Pat. No. 10,907,104, which is a
(Continued)

(51) Int. Cl.
*B01J 19/24* (2006.01)
*C10G 2/00* (2006.01)
(Continued)

(52) U.S. Cl.
CPC .............. *C10G 2/34* (2013.01); *B01J 19/245* (2013.01); *C01B 3/382* (2013.01); *C01B 3/40* (2013.01); *C10G 47/00* (2013.01); *C10L 1/06* (2013.01); *C10L 1/08* (2013.01); *C01B 2203/0233* (2013.01); *C01B 2203/0255* (2013.01); *C01B 2203/062* (2013.01); *C01B 2203/1052* (2013.01); *C01B 2203/1058* (2013.01); *C01B 2203/1064* (2013.01); *C10G 2300/1022* (2013.01); *C10G 2300/307* (2013.01); *C10G 2400/02* (2013.01); *C10G 2400/04* (2013.01); *C10G 2400/08* (2013.01); *C10L 2200/0492* (2013.01); *C10L 2270/023* (2013.01);
(Continued)

(58) Field of Classification Search
CPC .. C10G 2/34; C10G 47/00; C10G 2300/1022; C10G 2300/307; C10G 2400/02; C10G 2400/04; C10G 2400/08; B01J 19/245; C01B 3/382; C01B 3/40; C01B 2203/0233; C01B 2203/0255; C01B 2203/062; C01B 2203/1052; C01B 2203/1058; C01B 2203/1064; C10L 1/06; C10L 1/08; C10L 2200/0492; C10L 2270/023; C10L 2270/026; C10L 2270/04; C10L 2290/02; C10L 2290/42
USPC ....................................................... 422/162
See application file for complete search history.

(56) References Cited

U.S. PATENT DOCUMENTS

| | | | | |
|---|---|---|---|---|
| 2004/0187386 A1* | 9/2004 | Wangerow | ............. | B01J 8/0496 423/652 |
| 2009/0131731 A1* | 5/2009 | Wiliams | ................. | C07C 4/025 585/650 |
| 2014/0206780 A1* | 7/2014 | Kresnyak | ................. | C10G 2/30 518/704 |

* cited by examiner

*Primary Examiner* — Huy Tram Nguyen
(74) *Attorney, Agent, or Firm* — AdamsIP, LLC

(57) ABSTRACT

A syngas generator is disclosed as an exothermic gas generator that can accommodate high combustion temperatures of a natural gas/oxygen flame. The generator includes four sections: a heavily insulated combustion chamber, a catalyst chamber, a spray chamber, and a heat exchanger. These four sections may be arranged in series and tightly bolted together to form a gas-tight system. Natural gas, oxygen and steam are supplied to a burner at the inlet end of the combustion chamber. This mixture is ignited and the resulting hot process gas is then fed into a catalyst bed where it reacts with the steam and is converted to carbon monoxide and hydrogen (syngas). The syngas is fed to a Fischer-Tropsch unit to create liquid fuel.

12 Claims, 2 Drawing Sheets

Related U.S. Application Data continuation of application No. 16/047,232, filed on Jul. 27, 2018, now Pat. No. 10,633,594.

(60) Provisional application No. 62/562,108, filed on Sep. 22, 2017.

(51) Int. Cl.
| | |
|---|---|
| *C10L 1/06* | (2006.01) |
| *C10L 1/08* | (2006.01) |
| *C01B 3/38* | (2006.01) |
| *C01B 3/40* | (2006.01) |
| *C10G 47/00* | (2006.01) |

(52) U.S. Cl.
CPC ..... *C10L 2270/026* (2013.01); *C10L 2270/04* (2013.01); *C10L 2290/02* (2013.01); *C10L 2290/42* (2013.01)

SYNGAS GENERATION FOR GAS-TO-LIQUID FUEL CONVERSION

CROSS REFERENCES

This application is a continuation of U.S. application Ser. No. 16/813,582, filed on Mar. 9, 2020, which is a continuation of U.S. application Ser. No. 16/047,232, filed on Jul. 27, 2018, which claims the benefit of U.S. Provisional Application No. 62/517,473, filed on Jun. 9, 2017, and U.S. Provisional Application No. 62/562,108, filed on Sep. 22, 2017, which applications are incorporated herein by reference.

FIELD OF THE DISCLOSURE

The subject matter of the present disclosure refers generally to a method for syngas generation for gas-to-liquid fuel conversion.

BACKGROUND

Syngas or synthesis gas is a mixture comprising hydrogen and carbon monoxide along with small quantities of carbon dioxide, methane, and other trace gases. Syngas is normally produced from a feedstock hydrocarbon, such as natural gas, liquefied petroleum gas, naphtha, and residual oil. Syngas can be used directly or may be converted to other gaseous, liquid, or solid products, such as industrial gases, alcohols, transportation fuels, ammonia, urea, etc. Syngas can be used in a gas-to-liquid (GTL) process using a Fischer-Tropsch process to rearrange the carbon and hydrogen molecules to produces a liquid hydrocarbon molecule that can be used as a fuel or blend stock, for example.

Syngas is produced by gasification of the feedstock. Existing gasification processes for generating syngas include, for example, steam reforming, autothermal reforming, pyrolysis, and partial oxidation. Existing methods for generating syngas create challenges such as controlling the hydrogen/carbon monoxide ratio, providing sufficient water (steam reforming) or oxygen (partial oxidation), providing catalysts, and managing high temperatures generated in the processes.

Natural gas is a naturally occurring hydrocarbon gas mixture consisting primarily of methane. Natural gas is used as a source of energy for heating, cooking, and electricity generation. It may also be used as feedstock in the manufacture of liquid fuel using a GTL process. There is an abundance of natural gas in undeveloped fields, capped wells, and storage tanks. Existing GTL processes are not economical for use in converting natural gas to liquid fuels due to the high capital and operating costs to process natural gas at the widely-distributed locations.

SUMMARY

Natural gas can be converted to liquid fuels, such as kerosene, diesel, or jet fuel. This gas-to-liquid (GTL) process has two main steps: (1) the generation of the synthesis gas (syngas), and (2) the conversion of the synthesis gas into liquid fuels, such as kerosene and diesel.

Synthesis gas may be generated by the partial combustion of natural gas and pure oxygen. Steam may be added to the mixture to control the flame temperature and to raise the conversion of natural gas to synthesis gas. The partially combusted natural gas/oxygen/steam mixture then passes through a catalyst that converts unburned natural gas into synthesis gas. The resulting synthesis gas may then be converted into liquid fuels using the Fischer-Tropsch process.

A syngas generator according to embodiments disclosed herein is an exothermic gas generator that is configured to accommodate high combustion temperatures of a natural gas/oxygen flame. The generator consists of four sections: a heavily insulated combustion chamber, a catalyst chamber, a spray chamber, and a heat exchanger. In an example embodiment, these four sections are arranged in series and are tightly bolted together to form a gas-tight system.

Natural gas, oxygen and steam are supplied to a burner at the inlet end of the combustion chamber. This mixture is ignited and the resulting hot process gas is then fed into a catalyst bed where it reacts with the steam and is converted to carbon monoxide. The hot process gas then leaves the catalyst bed and enters a spray chamber where it is cooled in a fine spray of water mist. The synthesis gas then exits the spray chamber and is further cooled by a heat exchanger in which steam is also condensed. The synthesis gas, now at room temperature, is ready to be fed to a Fischer-Tropsch unit in the second step in the GTL process.

In an example embodiment, the GTL process receives a natural gas stream and converts the hydrocarbon components to a synfuel product. The synfuel product is a high cetane, low density, sulfur free premium fuel. The synfuel product has a high cetane number of 80 compared to a typical refined diesel of 40 with less nitrogen oxides (NOx), sulfur oxides (SOx), and particulate matter than conventional diesel. The synfuel can be used in heavy-duty diesel vehicles without modification or can be used as a blending agent for other fuel stock.

The foregoing summary has outlined some features of the system and method of the present disclosure so that those skilled in the pertinent art may better understand the detailed description that follows. Additional features that form the subject of the claims will be described hereinafter. Those skilled in the pertinent art should appreciate that they can readily utilize these features for designing or modifying other structures for carrying out the same purpose of the system and method disclosed herein. Those skilled in the pertinent art should also realize that such equivalent designs or modifications do not depart from the scope of the system and method of the present disclosure.

DESCRIPTION OF THE DRAWINGS

These and other features, aspects, and advantages of the present disclosure will become better understood with regard to the following description, appended claims, and accompanying drawings where:

DETAILED DESCRIPTION

Figure 1:
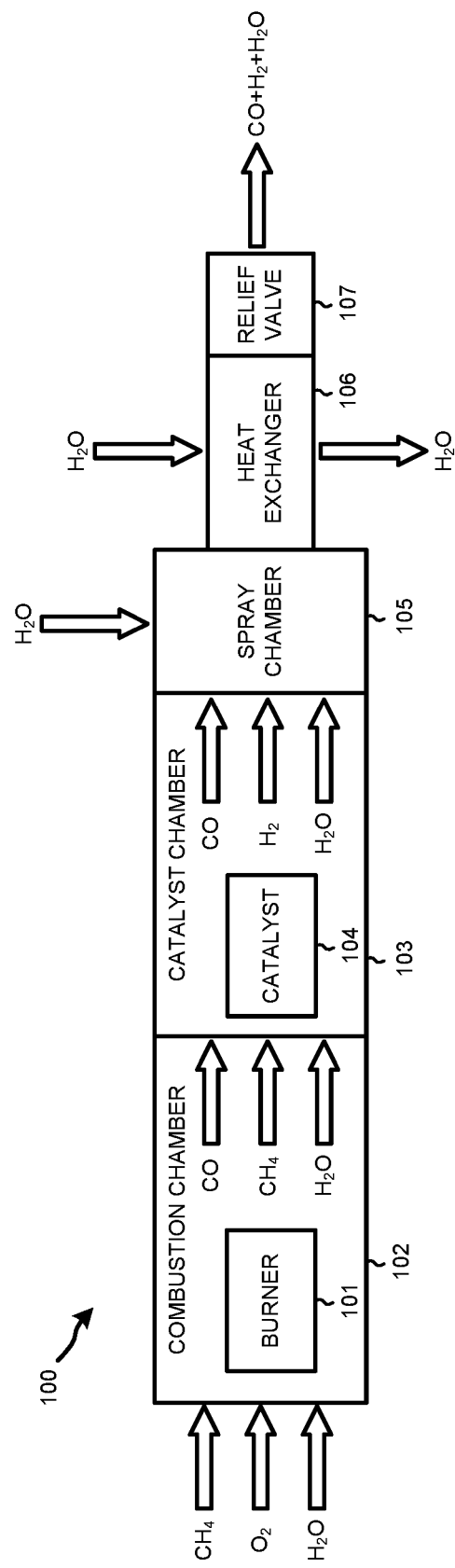
FIG. 1 is a block diagram of a reformer unit according to one embodiment.

In the Summary above and in this Detailed Description, and the claims below, and in the accompanying drawings, reference is made to particular features, including method steps, of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with/or in the context of other particular aspects of the embodiments of the invention, and in the invention generally.

The term "comprises" and grammatical equivalents thereof are used herein to mean that other components, steps, etc. are optionally present. For example, a system "comprising" components A, B, and C can contain only components A, B, and C, or can contain not only components A, B, and C, but also one or more other components. As used herein, the term "created vector" and grammatical equivalents refers to the one or more vectors created by the processor based on the mapped activation levels of the one or more sensors.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

Gas reforming is a chemical process used to convert natural gas into various gaseous products. When reforming is performed with steam (H2O)—i.e., steam methane reforming (SMR)—the resulting products typically are hydrogen (H2) and carbon dioxide (CO2). Equation 1 represents the conversion of a natural gas feedstock (composed primarily of methane (CH4)) using SMR:

$$2H_2O + CH_4 \rightarrow 4H_2 + CO_2 \tag{1}$$

In this process, the water gas shift reaction converts any carbon monoxide (CO) generated during the process into CO2 and H2. This approach is used in industries that require large amounts of H2, such as refineries that use hydrotreating, as it is more economical than splitting water with electricity.

Traditional GTL facilities utilize SMR to produce syngas. An SMR operates by reacting the inlet natural gas with steam at high temperatures to produce the syngas product. Under certain conditions, SMR yields a mixture of H2 and CO (i.e., syngas) as shown in Equation 2.

$$H_2O + CH_4 \rightarrow 3H_2 + CO \tag{2}$$

Syngas can also be generated using a dry reforming process in which CO2 is used instead of water as shown in Equation 3.

$$CO_2 + CH_4 \rightarrow 2H_2 + 2CO \tag{3}$$

Syngas may be used, for example, in the annealing of metals, the synthesis of methanol, and as a feedstock for the Fischer-Tropsch synthesis (FTS) reaction. The FTS reaction is used to make short to long chained hydrocarbons as shown in Equation 4. These hydrocarbon chains have a nearly unlimited market, such as diesel and jet fuel.

$$(2n+1)H_2 + nCO \rightarrow C_nH_{2n+2} nH_2O \tag{4}$$

In one embodiment, natural gas can be converted to liquid fuels (i.e., GTL) by combining SMR and FTS. Existing and proposed GTL plant designs using the SMR+FTS approach have not shown to be successful economically for small-scale production (i.e., less than 10,000 bbl/day).

The SMR approach to reforming is well established and is ideal for the generation of H2, but is not ideal for the generation of syngas for FTS. The ratio of hydrogen to carbon monoxide is 3:1 using a traditional SMR process. The ideal ratio is 2:1 for a Fischer-Tropsch reaction. The SMR reaction produces nearly 50% more H2 than what is required by the FTS, which leads to wasted energy and wasted natural gas when SMR is used for GTL. The dry reforming approach generates syngas with 50% less H2 and thus is not ideally suited for FTS. Additionally, dry reforming is less widely used due to catalyst deactivation issues.

Referring to the FTS reaction shown in Equation 4 above, note that for large values of n the H2:CO ratio approaches 2:1. Thus the ideal reformer for a GTL process would generate a syngas molar ratio close to 2:1. One approach that accomplishes this goal is to use a combination of reformer technologies. For example, an SMR and a dry reformer may be used in parallel and the outputs mixed to give the required 2:1 ratio. However, such an approach would add significant capital cost and technical complexity to a GTL plant.

Another approach is to execute the reactions in series. For example, the partial oxidation of an excess of methane with oxygen generates CO and water H2O as shown in Equation 5 below. The unreacted methane and the oxidation products can then be used in the SMR stage as shown in Equation 6.

$$1.5O_2 + 3CH_4 \rightarrow CO + 2H_2O + 2CH_4 \tag{5}$$

$$CO + 2H_2O + 2CH_4 \rightarrow 6H_2 + 3CO \tag{6}$$

The partial oxidation reaction also produces heat that can be fed to the SMR reaction, which requires heat. The water produced by partial oxidation is the amount required by SMR. Thus, these reactions can be run in series and even in the same reaction vessel. The overall reaction shown in Equation 7 achieves the desired 2:1 ratio.

$$0.5O_2 + CH_4 \rightarrow CO + 2H_2 \tag{7}$$

FIG. 1 is a block diagram of a reformer unit 100 that implements partial oxidation in series with SMR. Methane (CH4), oxygen (O2), and steam (H2O) are injected continuously through a burner 101 and ignited in the combustion chamber 102. The steam is used to control the temperature of the flame and is necessary to increase the selectivity of the reaction to produce carbon monoxide (CO). Without cooling, the high temperatures created would result in the formation of coke and carbon dioxide (CO2) rather than CO in combustion chamber 102.

The mixture of CO, unreacted methane, and steam proceeds to catalyst chamber 103. In one embodiment, catalyst chamber 103 is packed with a catalyst 104 composed of 9% nickel on a firebrick support. Other catalysts, such as cobalt and/or ruthenium, may also be used. The hot process gas from the combustion chamber 102 reacts with the steam on the catalyst bed and about 94% of the gas is converted to carbon monoxide. The heat generated in combustion chamber 102 drives the SMR reaction on the surface of the catalyst in catalyst chamber 103 to generate syngas (CO+H2).

A mixture of syngas and steam flows into spray chamber 105 where the syngas is rapidly cooled by a water spray. Hot carbon monoxide can form soot and carbon dioxide if allowed to cool slowly. This problem is avoided by passing the hot gas through a fine spray of water mist so that the mixture cools quickly to about 600° F. in spray chamber 105.

The cooled gas then moves to heat exchanger 106 where it is cooled. In one embodiment, heat exchanger 106 is a water-cooled heat exchanger that cools the gas to approximately 90° F. Cooling water, as well as condensed steam from spray chamber 105, drains from heat exchanger 106. Water-saturated syngas (CO+H2+H2O) exits the reformer unit 100 through a relief valve 107. In one embodiment, the relief valve 107 is set to 5 psig. The water-saturated syngas then moves on to the rest of the GTL process, such as to a Fischer-Tropsch process.

Although the example reformer unit embodiment illustrated in FIG. 1 is oriented horizontally, it will be understood that the reformer unit may be oriented vertically in other embodiments. For example, in a production environment, the reformer unit may be oriented vertically with the combustion chamber on top and the heat exchanger on the bottom so that the gases move through the reformer unit from top to bottom.

The reformer unit 100 is an exothermic gas generator that is configured to accommodate high combustion temperatures of a natural gas/oxygen flame. The sections: combustion chamber 102, catalyst chamber 103, spray chamber 105, and heat exchanger 106, are arranged in series and are tightly bolted together to form a gas-tight system.

Figure 2:
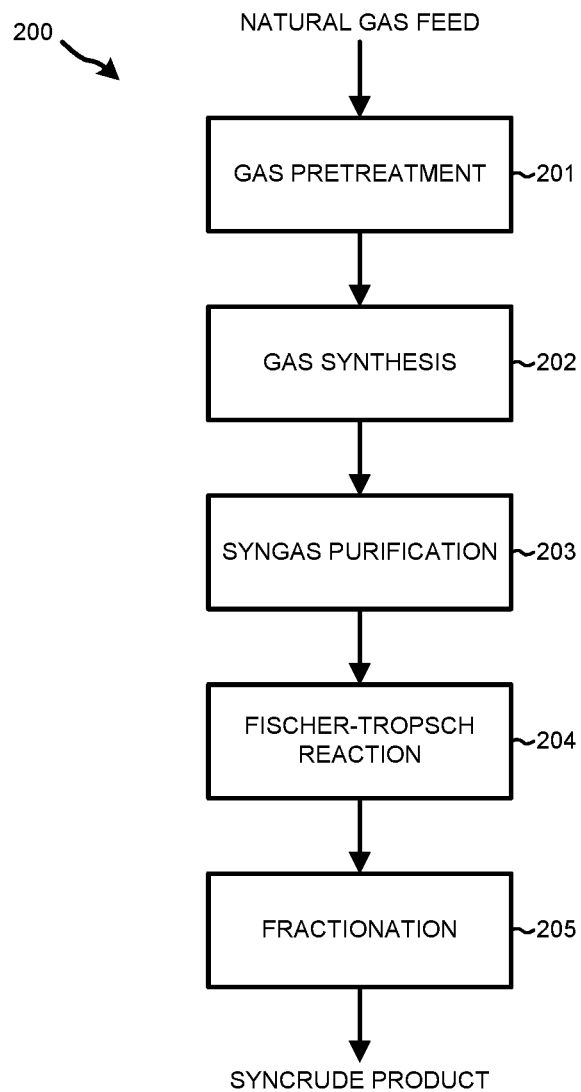
FIG. 2 is a block diagram of a GTL process according to one embodiment.

FIG. 2 is a block diagram of a GTL process according to one embodiment. A natural gas (CH4) feed from a well or a pipeline quality gas source, for example, is pretreated in step 201. The pretreatment removes any impurities or inhibitors from the natural gas feedstock, such as any sulfur-bearing compounds (e.g., sulfur (S), hydrogen sulfide (H2S)), carbon dioxide (CO2), particulates, mercaptans, and free liquids. This process utilizes traditional gas processing techniques and equipment.

The treated natural gas is processed in step 202, wherein the natural gas is converted to syngas (CO+H2). The reformer unit illustrated in FIG. 1 may be used in this process. Depending upon the efficiency of the gas synthesis process and the quality of the resulting syngas, the syngas may be purified in step 203 to remove impurities.

The syngas is then fed to a Fischer-Tropsch synthesis process in step 204. This process creates long chain hydrocarbons from the syngas. The output of the Fischer-Tropsch reaction then undergoes fractionation in a hydrocracking unit in step 205 to produce syncrude fuels, such as gasoline, naphtha, kerosene, jet fuel, and diesel.

The syngas production and GTL process disclosed herein provide a high conversion efficiency (i.e., the amount of inlet gas received by the process versus the amount of GTL fuel produced from the Fischer-Tropsch step) compared to existing GTL processes. In existing systems, the Fischer-Tropsch reactor is less efficient and produces excess unreacted syngas, light hydrocarbon tail gases, and/or long-chain hydrocarbon waxes due to the excess hydrogen present from an SMR. Due to the inefficient syngas conversion ratio and subsequent Fischer-Tropsch operating conditions, traditional GTL facilities produce approximately only one barrel of GTL fuel per 20,000 standard cubic feet (SCF) of inlet natural gas. The GTL process disclosed herein can produce approximately one barrel of GTL fuel per 11,000 standard cubic feet (SCF) of inlet gas. Increased production efficiency allows for this 55% increase in GTL fuel production compared to existing GTL technology.

The conversion rate of inlet gas to GTL fuel is driven by the operational efficiency of the syngas generator and the Fischer-Tropsch reactor. Ideally, a syngas generator, such as the reformer unit 100 in FIG. 1, will produce a 2:1 ratio of hydrogen to carbon monoxide to feed to the Fischer-Tropsch reactor. The key economic driver from an operational and capital cost perspective is to have the GTL facility maximize the production of the GTL fuel and minimize the production of the unreacted syngas, light hydrocarbon tail gases, and long-chain hydrocarbon waxes from the Fischer-Tropsch reactor. If the inlet syngas ratio is imbalanced either way or the Fischer-Tropsch reaction is not within the specified operating envelop, the inlet gas to GTL fuel conversion will be diminished. A lower conversion rate will result in high concentrations of unreacted syngas, light hydrocarbon tail gases, or hydrocarbon waxes. The GTL process disclosed above maximizes the GTL fuel conversion production and minimizes the production of unreacted syngas, light hydrocarbon tail gases, or hydrocarbon waxes. The GTL process disclosed herein produces a pure liquid synfuel of high cetane value (78-82) as opposed to the market specifications for diesel fuel of 42 to 44 cetane. As such, the high cetane synfuel may be used as a blend stock with fuels created from other sources.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation. As such, it is understood that versions of the present disclosure may come in different forms and embodiments. Additionally, it is understood that one of skill in the art would appreciate these various forms and embodiments as falling within the scope of the invention as disclosed herein.

What is claimed is:

1. An apparatus, comprising:
a combustion section having inputs for methane, oxygen, and steam and having a burner configured to ignite input gases, the combustion section generating an output comprising carbon monoxide, unreacted methane, and steam;
a catalyst chamber coupled to the combustion section and configured to receive the carbon monoxide, unreacted methane, and steam from the combustion section, the catalyst chamber comprising a catalyst selected to support the reaction of methane and steam to generate syngas;
a spray chamber coupled to the output of the catalyst chamber, the spray chamber comprising a water spray to cool the syngas,
wherein the combustion section, the catalyst chamber, and the spray chamber all form portions of a single reaction vessel;
a relief valve set to control the pressure inside the reaction vessel at a pressure no higher than 5 psig; and
a Fischer-Tropsch reactor coupled to the reaction vessel, wherein the Fischer-Tropsch reactor creates long chain hydrocarbons from the syngas.

2. The apparatus of claim 1, wherein the syngas comprises approximately a 2-to-1 ratio of hydrogen to carbon monoxide.

3. The apparatus of claim 1, wherein the catalyst is selected from one or more of: nickel, cobalt, and ruthenium.

4. The apparatus of claim 1, wherein a reaction in the combustion section is:

$$1.5O_2 + 3CH_4 \rightarrow CO + 2H_2O + 2CH_4.$$

5. The apparatus of claim 1, wherein a reaction in the catalyst chamber is:

$$CO+2H_2O+2CH_4 \rightarrow 6H_2+3CO.$$

6. The apparatus of claim 1, wherein an overall reaction in the reaction vessel is:

$$O_2+2CH_4 \rightarrow 2CO+4H_2.$$

7. The apparatus of claim 1, wherein the apparatus further comprises a hydrocracking unit coupled to an output of the Fischer-Tropsch reactor, wherein the long chain hydrocarbons from the Fischer-Tropsch reactor undergoes fractionation in the hydrocracking unit to produce liquid fuel.

8. The apparatus of claim 7, wherein the liquid fuel is selected from one or more of: gasoline, naphtha, kerosene, jet fuel, and diesel.

9. The apparatus of claim 7, wherein one barrel of the liquid fuel is generated for approximately 11,000 standard cubic feet (SCF) of methane gas input to the combustion section.

10. The apparatus of claim 7, wherein the liquid fuel has a cetane number of at least 78.

11. The apparatus of claim 1, further comprising a gas pretreatment unit disposed between the combustion section and a methane source, wherein the pretreatment unit removes impurities from the input methane.

12. The apparatus of claim 1, wherein the input methane is received from a well, a pipeline, or a storage tank.

* * * * *